United States Patent
Jung et al.

(10) Patent No.: US 11,414,521 B2
(45) Date of Patent: *Aug. 16, 2022

(54) PREPARATION METHOD OF POLYARYLENE SULFIDE

(71) Applicant: LG CHEM, LTD., Seoul (KR)

(72) Inventors: Kwonsu Jung, Daejeon (KR); Joong Jin Han, Daejeon (KR); Eunju Park, Daejeon (KR); Hyun Woog Ryu, Daejeon (KR); Hansol Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 21 days.

This patent is subject to a terminal disclaimer.

(21) Appl. No.: 17/047,341

(22) PCT Filed: Jul. 3, 2019

(86) PCT No.: PCT/KR2019/008167
§ 371 (c)(1),
(2) Date: Oct. 13, 2020

(87) PCT Pub. No.: WO2020/009481
PCT Pub. Date: Jan. 9, 2020

(65) Prior Publication Data
US 2021/0115193 A1    Apr. 22, 2021

(30) Foreign Application Priority Data

Jul. 3, 2018   (KR) .................. 10-2018-0077236
Jul. 2, 2019   (KR) .................. 10-2019-0079236

(51) Int. Cl.
*C08G 75/0259* (2016.01)
*C08G 75/0213* (2016.01)
(Continued)

(52) U.S. Cl.
CPC ..... *C08G 75/0259* (2013.01); *C08G 75/0213* (2013.01); *C08G 75/0254* (2013.01); *C08G 75/0281* (2013.01)

(58) Field of Classification Search
CPC ................ C08G 75/14; C08G 75/0263; C08G 75/0268; C08G 75/0259; C08G 75/025; C08G 75/0281
See application file for complete search history.

(56) References Cited

U.S. PATENT DOCUMENTS 4,645,826 A   2/1987   Iizuka et al.
4,935,476 A   6/1990   Hasenbein et al.
(Continued)

FOREIGN PATENT DOCUMENTS

EP    1702943 A1   9/2006
JP    2005-194312 A   7/2005
(Continued)

OTHER PUBLICATIONS

Fahey, et al. "Mechanism of Poly(p-phenylene sulfide) Growth from p-Dichlorobenzene and Sodium Sulfide", Macromolecules 1991, vol. 24, No. 15, pp. 4242-4249.

*Primary Examiner* — Shane Fang
(74) *Attorney, Agent, or Firm* — Dentons US LLP

(57) ABSTRACT

The present disclosure relates to a preparation method of a polyarylene sulfide, and this method may produce a polyarylene sulfide having properties equal to or higher than those of the conventional method at a high yield by using a dihalogenated aromatic compound in a predetermined equivalent ratio with respect to a sulfur compound and performing both dehydration and polymerization under optimum conditions.

11 Claims, 1 Drawing Sheet

(51) Int. Cl.
*C08G 75/0254* (2016.01)
*C08G 75/0281* (2016.01)

(56) References Cited

U.S. PATENT DOCUMENTS

| | | | |
|---|---|---|---|
| 5,126,430 A * | 6/1992 | Senga | C08G 75/025 528/226 |
| 5,171,831 A | 12/1992 | Nesheiwat et al. | |
| 8,609,790 B2 | 12/2013 | Suzuki et al. | |
| 9,068,047 B2 | 6/2015 | Ichinose et al. | |
| 9,422,400 B2 | 8/2016 | Konno et al. | |
| 2007/0161777 A1 | 7/2007 | Sato et al. | |
| 2010/0234559 A1 | 9/2010 | Sato et al. | |
| 2016/0244612 A1* | 8/2016 | Unohara | C08L 23/02 |
| 2017/0137573 A1 | 5/2017 | Suzuki et al. | |
| 2017/0362387 A1 | 12/2017 | Konno et al. | |
| 2018/0112042 A1 | 4/2018 | Konno et al. | |
| 2019/0055358 A1 | 2/2019 | Konno et al. | |
| 2020/0181330 A1 | 6/2020 | Jung et al. | |

FOREIGN PATENT DOCUMENTS

| | | |
|---|---|---|
| JP | 2006225639 A | 8/2006 |
| JP | 4256506 B2 | 4/2009 |
| JP | 4770134 B2 | 9/2011 |
| JP | 5125993 B2 | 1/2013 |
| JP | 5623277 B2 | 11/2014 |
| JP | 5788871 B2 | 10/2015 |
| JP | 2017179255 A | 10/2017 |
| JP | 2019-522099 A | 8/2019 |
| KR | 910007007 B1 | 9/1991 |
| KR | 20060127915 A | 12/2006 |
| KR | 20130025349 A | 3/2013 |
| KR | 101660614 B1 | 9/2016 |
| KR | 20170093935 A | 8/2017 |
| KR | 20180053974 A | 5/2018 |
| WO | 2015152032 A1 | 10/2015 |
| WO | 2016108270 A1 | 7/2016 |
| WO | 2016-159234 A1 | 10/2016 |
| WO | 2018117426 A2 | 6/2018 |

\* cited by examiner

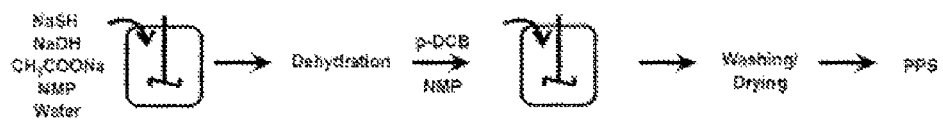

PREPARATION METHOD OF POLYARYLENE SULFIDE

The present application is a National Phase entry pursuant to 35 U.S.C. § 371 of International Application No. PCT/KR2019/008167 filed on Jul. 3, 2019, and claims priority to and the benefit of Korean Patent Applications No. 10-2018-0077236 filed on Jul. 3, 2018 and No. 10-2019-0079236 filed on Jul. 2, 2019 with the Korean Intellectual Property Office, the disclosures of which are incorporated herein by reference in their entirety.

FIELD

The present disclosure relates to a method of preparing a polyarylene sulfide exhibiting excellent strength, heat resistance, flame retardancy, and processability when processed into a molded product at a high yield.

BACKGROUND

Polyarylene sulfide (PAS), which is represented by polyphenylene sulfide (PPS), has been widely used in automobiles, electrical and electronic products, machinery and the like to replace metals, especially die cast metals such as aluminum and zinc, due to its excellent strength, heat resistance, flame retardancy, and processability. Particularly, since the PPS resin has excellent flowability, it is suitable for use as a compound by kneading with a filler such as glass fiber or a reinforcing agent.

Generally, PAS is prepared by polymerizing a sulfur source and a dihalogenated aromatic compound in the presence of an amide-based compound such as N-methyl pyrrolidone (NMP). A molecular weight modifier such as an alkali metal salt may optionally be further used.

In particular, along with the increase in demand for PAS, it is required to improve the yield in the preparation of PAS. For example, Japanese Patent No. 5623277 discloses a production process of a granular PAS including a step of adding an aromatic compound such as a dihalo aromatic compound and a trihaloaromatic compound to a liquid phase in a polymerization reaction system after a phase-separation polymerization process, and a step of cooling the liquid phase. This process can produce granular PAS at a high yield. There has been a demand for a method capable of further improving the yield of PAS.

Therefore, in the process for preparing a polyarylene sulfide in which a sulfur source and a dihalogenated aromatic compound are subjected to a polymerization reaction in the presence of an amide-based compound, research on a method of preparing a polyarylene sulfide at a high yield is required.

SUMMARY

The present disclosure is to provide a method of preparing a polyarylene sulfide having excellent strength, heat resistance, flame retardancy, processability, and the like, at a high yield by using a dihalogenated aromatic compound in a predetermined equivalent ratio with respect to a sulfur compound and performing both dehydration and polymerization under optimum conditions.

According to an embodiment of the present disclosure, there is provided a preparation method of a polyarylene sulfide, including: preparing a sulfur source comprising a sulfide of an alkali metal and a mixed solvent of water and an amide-based compound by dehydrating a hydrosulfide of an alkali metal and a hydroxide of an alkali metal in the presence of an organic acid salt of an alkali metal at a temperature of 185° C. to 205° C. in a mixed solvent of water and an amide-based compound; and preparing a polyarylene sulfide by adding a dihalogenated aromatic compound and an amide-based compound to a reactor containing the sulfur source, and performing a polymerization reaction at a temperature of 225° C. to 245° C., followed by a polymerization reaction at a temperature of 250° C. to 260° C., wherein a dehydration liquid removed during the dehydration reaction contains 15% (v/v) to 35% (v/v) of the amide-based compound based on a total volume, and the dihalogenated aromatic compound is used in an amount of 1.04 to 1.08 equivalents based on 1 equivalent of the hydrosulfide of an alkali metal in the polymerization reaction.

In the present disclosure, the polyarylene sulfide may be produced at a yield of 85% or more, and may have a melt viscosity of 20 Pa·S to 150 Pa·S.

As described above, the present disclosure can prepare a polyarylene sulfide having excellent strength, heat resistance, flame retardancy, processability, and the like at a high yield by using a dihalogenated aromatic compound in a predetermined equivalent ratio with respect to a sulfur compound and performing both dehydration and polymerization under optimum conditions.

BRIEF DESCRIPTION OF THE DRAWING

The FIGURE is a schematic illustration of a process for preparing a polyarylene sulfide of the Examples of the present disclosure.

DETAILED DESCRIPTION

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in detail.

According to an embodiment of the present disclosure, there is provided a preparation method of a polyarylene sulfide having excellent strength, heat resistance, flame retardancy, processability, and the like, at a high yield by using a dihalogenated aromatic compound in a predetermined equivalent ratio with respect to a sulfur compound and performing both dehydration and polymerization under optimum conditions, while performing the dehydration in the presence of an organic acid salt of an alkali metal to prepare a sulfur source.

The preparation method of a polyarylene sulfide includes a first step of preparing a sulfur source including a sulfide of an alkali metal and a mixed solvent of water and an amide-based compound by dehydrating a hydrosulfide of an alkali metal and a hydroxide of an alkali metal in the presence of an organic acid salt of an alkali metal at a temperature of 185 degree Celsius (° C.) to 205 degree Celsius (° C.) in a mixed solvent of water and an amide-based compound; and a second step of preparing a polyarylene sulfide by adding a dihalogenated aromatic compound and an amide-based compound to a reactor containing the sulfur source, and performing a polymerization reaction at a temperature of 225° C. to 245° C., followed by a polymerization reaction at a temperature of 250° C. to 260° C.

In addition, the preparation method of a polyarylene sulfide of the present disclosure is characterized in that a dehydration liquid removed during the dehydration reaction of the first step contains about 15% (v/v) to about 35% (v/v) of the amide-based compound based on a total volume, and the dihalogenated aromatic compound is used in an amount of about 1.04 to about 1.08 equivalents based on 1 equivalent of the hydrosulfide of an alkali metal in the polymerization reaction of the sulfur source prepared by the dehydration and the dihalogenated aromatic compound.

In particular, the present disclosure may significantly increase the yield of the resulting polyarylene sulfide by adding a dihalogenated aromatic compound in a predetermined amount and performing both dehydration and polymerization under optimum conditions. In addition, the present disclosure may easily prepare a polyarylene sulfide capable of providing a final polymer product having a thermal property equivalent to or higher than that of the conventional polymer product. Further, the preparation method of a polyarylene sulfide of the present disclosure can also improve the yield and increase the amount of the final product.

Moreover, it was not known exactly what factors improve the yield when preparing polyarylene sulfide resins having general viscosity, which are used for general purposes, not for special purposes. However, the present inventors have completed the present invention by identifying main factors that greatly affect the yield among various process factors through response surface methodology. In particular, the present disclosure may prepare a polyarylene sulfide having general viscosity at an excellent yield by closely identifying how the interaction between effective factors of the reaction affects, thereby obtaining an excellent effect of improving economic efficiency.

First, the preparation method of a polyarylene sulfide according to an embodiment of the present disclosure will be described.

The above-described first step is preparing a sulfur source.

The sulfur source is prepared by dehydrating a hydrosulfide of an alkali metal and a hydroxide of an alkali metal in the presence of an organic acid salt of an alkali metal in a mixed solvent of water and an amide-based compound. Therefore, the sulfur source may include the mixed solvent of water and an amide-based compound remaining after the dehydration, together with a sulfide of an alkali metal prepared by the reaction of the hydrosulfide of an alkali metal with the hydroxide of an alkali metal.

Thereafter, in the present disclosure, a polyarylene sulfide is prepared at a high yield by continuously polymerizing the sulfur source, the dihalogenated aromatic compound and the amide-based compound.

The sulfide of an alkali metal may be determined depending on the type of the hydrosulfide of an alkali metal used in the reaction. Specific examples thereof include lithium sulfide, sodium sulfide, potassium sulfide, rubidium sulfide, and cesium sulfide, and any one or a mixture of two or more thereof may be used.

Specific examples of the hydrosulfide of an alkali metal that can be used in the preparation of the sulfur source by reacting the hydrosulfide of an alkali metal with the hydroxide of an alkali metal include lithium hydrogen sulfide, sodium hydrogen sulfide, potassium hydrogen sulfide, rubidium hydrogen sulfide, cesium hydrogen sulfide, and the like. Any one or a mixture of two or more thereof may be used, and an anhydride or a hydrate thereof may be used.

Specific examples of the hydroxide of an alkali metal include lithium hydroxide, sodium hydroxide, potassium hydroxide, rubidium hydroxide, cesium hydroxide and the like, and any one or a mixture of two or more thereof may be used. The hydroxide of an alkali metal may be used in an amount of about 0.90 to about 2.0 equivalents, more specifically about 1.0 to about 1.5 equivalents, and more particularly about 1.0 to about 1.1 equivalents, based on 1 equivalent of the hydrosulfide of an alkali metal.

In the present disclosure, the equivalent refers to molar equivalent (eq/mol).

Further, in the preparation of the sulfur source by the reaction of the hydrosulfide of an alkali metal with the hydroxide of an alkali metal, an organic acid salt of an alkali metal capable of promoting the polymerization reaction and increasing the degree of polymerization of a polyarylene sulfide in a short period of time is added as a polymerization assistant. Specific examples of the organic acid salt of an alkali metal include lithium acetate, sodium acetate, and the like, and any one or a mixture of two or more thereof may be used. In addition, the organic acid salt of an alkali metal may be used in an amount of about 0.01 equivalent or more, about 0.05 equivalent or more, about 0.1 equivalent or more, 0.18 equivalent or more, or about 0.23 equivalent or more based on 1 equivalent of the hydrosulfide of an alkali metal, in order to prepare a polyarylene sulfide having a melt viscosity suitable for general purpose at a high yield. However, considering that the organic acid salt of an alkali metal is a polymerization assistant that functions as a catalyst and is a factor in the increase in manufacturing cost when used in excess, it is preferably used in an amount of about 1.0 equivalent or less, about 0.8 equivalent or less, about 0.6 equivalent or less, about 0.5 equivalent or less, or about 0.45 equivalent or less.

The reaction between the hydrosulfide of an alkali metal and the hydroxide of an alkali metal may be carried out in a mixed solvent of water and an amide-based compound. Specific examples of the amide-based compound include amide compounds such as N,N-dimethylformamide or N,N-dimethylacetamide; pyrrolidone compounds such as N-methyl-2-pyrrolidone (NMP) or N-cyclohexyl-2-pyrrolidone; caprolactam compounds such as N-methyl-ε-caprolactam, imidazolidinone compounds such as 1,3-dialkyl-2-imidazolidinone; urea compounds such as tetramethyl urea; phosphoric acid amide compounds such as hexamethylphosphoric acid triamide; and the like, and any one or a mixture of two or more thereof may be used. Among them, the amide-based compound may preferably be N-methyl-2- pyrrolidone (NMP), considering a reaction efficiency and a co-solvent effect as a polymerization solvent for preparing a polyarylene sulfide.

Water may be used in an amount of about 1 to 8 equivalents, specifically about 1.5 to 5 equivalents, and more specifically about 2.5 to 4.5 equivalents, based on 1 equivalent of the amide-based compound.

Meanwhile, in the first step, a sulfide of an alkali metal may be prepared by dehydrating reactants containing a hydrosulfide of an alkali metal, a hydroxide of an alkali metal and the like. Herein, the dehydration reaction may be performed by stirring at about 100 rpm to 500 rpm, more preferably at about 100 rpm to 300 rpm, at a temperature of about 185° C. to 205° C. The dehydration reaction should be performed at a temperature of about 185° C. or more to optimize the amount of effective sulfur contained in the sulfur source used in the subsequent polymerization process, so that the amount of water remaining after the dehydration is lowered to about 3.5 equivalents or less based on 1 mol of effective sulfur. In addition, the dehydration reaction should be performed at a temperature of about 205° C. or less to optimize the amount of the amide-based compound exiting by the dehydration reaction, so that the amount of water remaining in the sulfur source is about 1.5 equivalents or more based on 1 mol of effective sulfur.

During the dehydration reaction, the solvent such as water in the reactants may be removed by distillation or the like, and some of the amide-based compound may be discharged together with the water. In addition, some of the sulfur contained in the sulfur source may react with water by heat during the dehydration reaction, and may be volatilized as hydrogen sulfide gas. At this time, a hydroxide of an alkali metal having the same number of moles as the hydrogen sulfide may be generated.

Particularly, a dehydration liquid generated during the dehydration reaction in the first step, that is, a dehydration liquid removed to the outside during the dehydration reaction contains about 15% (v/v) to about 35% (v/v) of the amide-based compound, based on a total volume of the entire mixture containing the mixed solvent of water and an amide-based compound. In order to optimize the melt viscosity of the polyarylene sulfide finally obtained by reacting the sulfur source with the dihalogenated aromatic compound, and to prepare the polyarylene sulfide at a high yield, wherein the sulfur source is prepared by dehydrating the hydrosulfide of an alkali metal and the like, the concentration of the amide-based compound should be maintained in the above-described range. Specifically, the concentration of the amide-based compound in the dehydration liquid may be about 25% to about 35% (v/v), or about 28% to about 32% (v/v).

As a result of the reaction of the hydrosulfide of an alkali metal, the hydroxide of an alkali metal and the alkali metal salt, a sulfide of an alkali metal is precipitated in a solid phase in a mixed solvent of water and an amide-based compound. And some unreacted hydrosulfide of an alkali metal may remain in the reaction system. Accordingly, when the sulfur source prepared by reacting the hydrosulfide of an alkali metal with the hydroxide of an alkali metal is used as a sulfur source in the preparation of a polyarylene sulfide according to the present disclosure, the molar ratio of the sulfur source refers to a total molar ratio of the sulfide of an alkali metal precipitated as a result of the reaction and the unreacted hydrosulfide of an alkali metal.

Further, during the dehydration reaction, the sulfur contained in the sulfur source, which remains in the hydrosulfide of an alkali metal introduced as the sulfur-containing reactant in the system, reacts with water to produce hydrogen sulfide and a hydroxide of an alkali metal, and the generated hydrogen sulfide is volatilized. Therefore, the amount of sulfur in the sulfur source remaining in the system after the dehydration reaction may be reduced by the hydrogen sulfide which is volatilized out of the system during the dehydration reaction. For example, when using the sulfur source mainly containing a hydrosulfide of an alkali metal, the amount of sulfur remaining in the system after the dehydration reaction is equal to the molar amount of sulfur in the sulfur source introduced as a reactant, which is the hydrosulfide of an alkali metal introduced as the sulfur-containing reactant, minus the molar amount of hydrogen sulfide volatilized out of the system. Therefore, it is necessary to quantify the amount of effective sulfur contained in the sulfur source remaining in the system after the dehydration reaction from the amount of hydrogen sulfide volatilized out of the system. Specifically, the dehydration reaction may be carried out until the molar ratio of water remaining in the system after the dehydration process to 1 mol of effective sulfur is about 1.5 to 3.5, specifically about 1.6 to 3.0, more specifically about 1.8 to 2.8. When the water content in the sulfur source is excessively decreased by the dehydration reaction, water may be added to adjust the water content before the polymerization process.

Accordingly, the sulfur source prepared by the reaction of the hydrosulfide of an alkali metal with the hydroxide of an alkali metal and the dehydration as described above may include a mixed solvent of water and an amide-based compound together with a sulfide of an alkali metal, and the water may be included in a molar ratio of about 1.5 to 3.5 based on 1 mol of sulfur contained in the sulfur source. In addition, the sulfur source may further include a hydroxide of an alkali metal prepared by the reaction of sulfur with water.

According to an embodiment of the present disclosure, the second step is polymerizing the sulfur source with a dihalogenated aromatic compound to prepare a polyarylene sulfide.

The dihalogenated aromatic compound usable for the preparation of the polyarylene sulfide is a compound in which two hydrogen atoms of an aromatic ring are substituted with halogen atoms. Specific examples thereof include o-dihalobenzene, m-dihalobenzene, p-dihalobenzene, dihalotoluene, dihalonaphthalene, dihalobiphenyl, dihalobenzoic acid, dihalodiphenyl ether, dihalodiphenylsulfone, dihalodiphenylsulfoxide, and dihalodiphenylketone, and any one or a mixture of two or more thereof may be used. In the dihalogenated aromatic compound, the halogen atom may be fluorine, chlorine, bromine or iodine. Among them, p-dichlorobenzene (p-DCB) may preferably be used in order to increase reactivity and suppress side reactions in the preparation of a polyarylene sulfide.

The dihalogenated aromatic compound should be added in an amount of about 1.04 to 1.08 equivalents, based on 1 equivalent of the hydrosulfide of an alkali metal. When the dihalogenated aromatic compound is added within the above range, a polyarylene sulfide having excellent physical properties may be obtained without increasing the content of chlorine present in the polyarylene sulfide. The dihalogenated aromatic compound should be added in an amount of about 1.04 to about 1.08 equivalents in order to achieve the excellent effect of controlling the input amount of the sulfur source and the dihalogenated aromatic compound, to adjust the melt viscosity and the total volatile organic compound, and to improve the yield.

In addition, a step of lowering the temperature of the reactor containing the sulfur source to a temperature of about 150° C. or more and less than about 200° C. may be further included before the second step to prevent vaporization of the dihalogenated aromatic compound.

Further, the polymerization reaction of the sulfur source and the dihalogenated aromatic compound may be carried out in a solvent of an amide-based compound which is a polar aprotic organic solvent and stable to an alkali at a high temperature.

Specific examples of the amide-based compound are as described above, and N-methyl-2-pyrrolidone (NMP) is preferable considering the reaction efficiency.

Since the amide-based compound contained in the sulfur source in the first step may function as a co-solvent, the amide-based compound may be added in the second step in a molar ratio of water ($H_2O$) to the amide-based compound present in the polymerization system (a ratio of water/an amide-based compound) to be about 0.85 or more.

In particular, the amide-based compound further added in the second step may be added in an amount of about 1.0 to about 2.0 equivalents, about 1.1 to about 1.85 equivalents, or about 1.1 to about 1.35 equivalents, based on 1 equivalent of the hydrosulfide of an alkali metal. Herein, when performing the polymerization reaction in the second step, the amide-based compound is further added so as to have a molar ratio of 2.5 to 4.0 based on 1 mol of sulfur. This corresponds to the content of the final amide-based compound present in the system during the polymerization reaction of the second step, and is a total amount of the amide-based compound remaining in the sulfur source obtained by the dehydration reaction in the first step and the amide-based compound further added in the second step. Meanwhile, the final content of the amide-based compound present in the system during the polymerization reaction of the second step can be confirmed, for example, by subtracting the amount of the amide-based compound discharged to the dehydration liquid of the first step from the total amount of the amide-based compound added during the first step and the second step.

During the polymerization reaction, other additives such as a molecular weight regulator, a cross-linking agent and the like for controlling the polymerization reaction or the molecular weight may be further added in an amount not lowering physical properties and the yield of the polyarylene sulfide to be finally prepared.

Meanwhile, the polymerization process of the second step of preparing a polyarylene sulfide by a polymerization reaction of the sulfur source and the dihalogenated aromatic compound is characterized in that it is carried out in a multi-step. Specifically, the polymerization process of the present disclosure includes a pre-polymerization process for preparing a pre-polymer of polyarylene sulfide by reacting a halogenated aromatic compound with a sulfur compound and a post-polymerization process for increasing the molecular weight and melt viscosity using the pre-polymer.

Accordingly, in the present disclosure, the polymerization reaction of the sulfur source and the dihalogenated aromatic compound should be performed as follows: a first polymerization reaction is performed at a temperature of about 225° C. to about 245° C., and then a second polymerization reaction is continuously performed at a temperature higher than that of the first polymerization reaction, specifically at about 250° C. to about 260° C. In order to effectively prepare the pre-polymer, the first polymerization reaction should be performed at a temperature of about 225° C. to about 245° C., specifically about 228° C. to about 245° C., or about 230° C. to about 245° C., in terms of improving conversion and yield. In addition, the second polymerization reaction should be performed at a temperature of about 250° C. or more to maintain the melt viscosity at a sufficient level to effectively perform injection molding. Excessive temperature rise may lower the yield and decrease the melt viscosity due to high temperature decomposition, so the reaction should be performed at a temperature of 260° C. or less.

For example, the second polymerization reaction may be performed at a temperature higher than that of the first polymerization reaction by about 5° C. to about 35° C., about 5° C. to about 32° C., or about 20° C. to about 30° C.

A reaction product prepared as a result of the above polymerization reaction is separated into an aqueous phase and an organic phase, and a polyarylene sulfide, which is a product of the polymerization reaction, is dissolved in the organic phase.

Accordingly, a process for precipitation and separation of the prepared polyarylene sulfide may be optionally performed.

In particular, the precipitation of the polyarylene sulfide may be carried out by adding water to the reaction mixture in an amount of 3 to 5 equivalents based on 1 equivalent of sulfur, and then cooling. When the water is added within the above range, the polyarylene sulfide may be precipitated with excellent efficiency.

The precipitated polyarylene sulfide may be optionally further subjected to washing, filtration and drying according to conventional methods.

As a specific preparation method of the polyarylene sulfide, following examples may be referred to. However, the preparation method of the polyarylene sulfide is not limited to this description. The preparation method may further include a step which is usually carried out in the technical field of the present invention, and the step(s) of the preparation method may be changed by the step(s) usually changeable.

Meanwhile, the preparation method of a polyarylene sulfide according to an embodiment of the present disclosure as described above may easily produce a polyarylene sulfide having a thermal property equal to or higher than that of the conventional method at an excellent yield.

Specifically, the polyarylene sulfide may be produced at a yield of about 85% or more, or about 85.5% or more, and may have a melt viscosity of about 20 Pa·S to 150 Pa·S, about 22 Pa·S to 130 Pa·S, about 25 Pa·S to 120 Pa·S, or about 40 Pa·S to 120 Pa·S. When the melt viscosity of the polyarylene sulfide is too low, polymer repeating units are shortened, so that a content of end groups, Cl, etc. is increased. This may cause a problem of low mechanical strength, and the melt viscosity is preferably about 20 Pa·S or more. Meanwhile, when the melt viscosity of the polyarylene sulfide is too high, molding conditions may be changed in order to facilitate the molding during injection molding, and about 150 Pa·S or less is preferable. That is, when the polyarylene sulfide has too small melt viscosity, mechanical strength may be insufficient, and when the polyarylene sulfide has too large melt viscosity, fluidity during melt molding of the resin composition is poor, so that the molding becomes difficult. Thus, the polyarylene sulfide may have the melt viscosity within the above-described range.

The polyarylene sulfide may have a melting point ($T_m$) of about 270° C. to 300° C., and a crystallization point (Tc) of about 180° C. to 250° C. Herein, the melting point ($T_m$) and the crystallization point (Tc) of the polyarylene sulfide may be measured using differential scanning calorimeter (DSC, manufactured by TA instrument, TA Q2000). As the measuring method is well known in the art, a detailed description thereof will be omitted.

The polyarylene sulfide may have a weight average molecular weight (Mw) of more than about 10000 g/mol to about 30000 g/mol or less. Herein, the weight average molecular weight (Mw) of the polyarylene sulfide may be measured using gel permeation chromatography (GPC). For example, it may be measured using PL-GPC220 (Waters) as a GPC apparatus and PLgel MIX-B 300 mm length column (Polymer Laboratories). The measuring method is well known in the art, and will not be described in detail.

Hereinafter, the present invention will be described in more detail with reference to the following preferred examples. However, these examples are for illustrative purposes only, and the invention is not intended to be limited by these examples.

EXAMPLES

Example 1

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP), and 4.72 equivalents of distilled water were added to the reactor. The reactor was heated to 195° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 30.2% as measured by gas chromatography. In addition, a molar ratio of $H_2O/S$ in the remaining mixture obtained as the sulfur source was calculated to be 1.82.

(2) The Polymerization Reaction

After a temperature of the reactor including the sulfur source obtained by the dehydration reaction was lowered below 170° C., 1.04 equivalents of para-dichlorobenzene (p-DCB) and 1.35 equivalents of NMP were added to the reactor. Herein, a molar ratio of NMP/S was calculated to be 2.63. Then, the obtained mixed solution was heated to 230° C. to react for 2 hours, and further heated to 260° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 85.8%, and the viscosity was 73.8 Pa·S.

Example 2

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 205° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 30.6% as measured by gas chromatography. In addition, a molar ratio of $H_2O/S$ in the remaining mixture obtained as the sulfur source was calculated to be 1.85.

(2) The Polymerization Reaction

After a temperature of the reactor including the sulfur source obtained by the dehydration reaction was lowered below 170° C., 1.06 equivalents of para-dichlorobenzene (p-DCB) and 1.35 equivalents of NMP were added to the reactor. Herein, a molar ratio of NMP/S was calculated to be 2.62. Then, the obtained mixed solution was heated to 230° C. to react for 2 hours, and further heated to 250° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 86.4%, and the viscosity was 58.0 Pa·S.

Example 3

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 205° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 30.9% as measured by gas chromatography. In addition, a molar ratio of $H_2O/S$ in the remaining mixture obtained as the sulfur source was calculated to be 1.81.

(2) The Polymerization Reaction

After a temperature of the reactor including the sulfur source obtained by the dehydration reaction was lowered below 170° C., 1.04 equivalents of para-dichlorobenzene (p-DCB) and 1.35 equivalents of NMP were added to the reactor. Herein, a molar ratio of NMP/S was calculated to be 2.61. Then, the obtained mixed solution was heated to 230° C. to react for 2 hours, and further heated to 255° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 85.0%, and the viscosity was 65.1 Pa·S.

Example 4

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 185° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 31.0% as measured by gas chromatography. In addition, a molar ratio of $H_2O/S$ in the remaining mixture obtained as the sulfur source was calculated to be 2.30.

(2) The Polymerization Reaction

After a temperature of the reactor including the sulfur source obtained by the dehydration reaction was lowered below 170° C., 1.06 equivalents of para-dichlorobenzene (p-DCB) and 1.35 equivalents of NMP were added to the reactor. Herein, a molar ratio of NMP/S was calculated to be 2.65. Then, the obtained mixed solution was heated to 230° C. to react for 2 hours, and further heated to 260° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 91.6%, and the viscosity was 46.4 Pa·S.

Example 5

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 195° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 29.9% as measured by gas chromatography. In addition, a molar ratio of $H_2O/S$ in the remaining mixture obtained as the sulfur source was calculated to be 1.92.

(2) The Polymerization Reaction

After a temperature of the reactor including the sulfur source obtained by the dehydration reaction was lowered below 170° C., 1.08 equivalents of para-dichlorobenzene (p-DCB) and 1.35 equivalents of NMP were added to the reactor. Herein, a molar ratio of NMP/S was calculated to be 2.64. Then, the obtained mixed solution was heated to 230° C. to react for 2 hours, and further heated to 260° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 87.8%, and the viscosity was 27.3 Pa·S.

Comparative Example 1

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 185° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 29.7% as measured by gas chromatography. In addition, a molar ratio of $H_2O/S$ in the remaining mixture obtained as the sulfur source was calculated to be 2.09.

(2) The Polymerization Reaction

After a temperature of the reactor including the sulfur source obtained by the dehydration reaction was lowered below 170° C., 1.015 equivalents of para-dichlorobenzene (p-DCB) and 1.35 equivalents of NMP were added to the reactor. Herein, a molar ratio of NMP/S was calculated to be 2.66. Then, the obtained mixed solution was heated to 230° C. to react for 2 hours, and further heated to 250° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1: 1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 79.6%, and the viscosity was 56.4 Pa·S.

Comparative Example 2

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 180° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 30.2% as measured by gas chromatography. In addition, a molar ratio of $H_2O/S$ in the remaining mixture obtained as the sulfur source was calculated to be 2.38.

(2) The Polymerization Reaction

After a temperature of the reactor including the sulfur source obtained by the dehydration reaction was lowered below 170° C., 0.99 equivalents of para-dichlorobenzene (p-DCB) and 1.35 equivalents of NMP were added to the reactor. Herein, a molar ratio of NMP/S was calculated to be 2.63. Then, the obtained mixed solution was heated to 230° C. to react for 2 hours, and further heated to 250° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1: 1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 77.7%, and the viscosity was 61.1 Pa·S.

Comparative Example 3

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 180° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 30.4% as measured by gas chromatography. In addition, a molar ratio of $H_2O/S$ in the remaining mixture obtained as the sulfur source was calculated to be 2.44.

(2) The Polymerization Reaction

After a temperature of the reactor including the sulfur source obtained by the dehydration reaction was lowered below 170° C., 0.99 equivalents of para-dichlorobenzene (p-DCB) and 1.35 equivalents of NMP were added to the reactor. Herein, a molar ratio of NMP/S was calculated to be 2.65. Then, the obtained mixed solution was heated to 230° C. to react for 2 hours, and further heated to 260° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1: 1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 69.4%, and the viscosity was 220.3 Pa·S.

Comparative Example 4

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 215° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 35.0% as measured by gas chromatography. In addition, a molar ratio of $H_2O/S$ in the remaining mixture obtained as the sulfur source was calculated to be 2.13.

(2) The Polymerization Reaction

After a temperature of the reactor including the sulfur source obtained by the dehydration reaction was lowered below 170° C., 1.025 equivalents of para-dichlorobenzene (p-DCB) and 1.35 equivalents of NMP were added to the reactor. Herein, a molar ratio of NMP/S was calculated to be 2.55. Then, the obtained mixed solution was heated to 230° C. to react for 2 hours, and further heated to 250° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 74.8%, and the viscosity was 62.3 Pa·S.

Comparative Example 5

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 185° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 28.9% as measured by gas chromatography. In addition, a molar ratio of $H_2O/S$ in the remaining mixture obtained as the sulfur source was calculated to be 2.21.

(2) The Polymerization Reaction

After a temperature of the reactor including the sulfur source obtained by the dehydration reaction was lowered below 170° C., 1.10 equivalents of para-dichlorobenzene (p-DCB) and 1.35 equivalents of NMP were added to the reactor. Herein, a molar ratio of NMP/S was calculated to be 2.68. Then, the obtained mixed solution was heated to 230° C. to react for 2 hours, and further heated to 250° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 83.2%, and the viscosity was 9.8 Pa·S.

Comparative Example 6

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.20 equivalent of sodium acetate ($CH_3COONa$) powder, 1.65 equivalents of N-methyl-2-pyrrolidone (NMP) and 4.72 equivalents of distilled water were added to the reactor. The reactor was heated to 210° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 28.6% as measured by gas chromatography. In addition, a molar ratio of $H_2O/S$ in the remaining mixture obtained as the sulfur source was calculated to be 1.82.

(2) The Polymerization Reaction

After a temperature of the reactor including the sulfur source obtained by the dehydration reaction was lowered below 170° C., 1.04 equivalents of para-dichlorobenzene (p-DCB) and 1.65 equivalents of NMP were added to the reactor. Herein, a molar ratio of NMP/S was calculated to be 2.96. Then, the obtained mixed solution was heated to 230° C. to react for 2 hours, and further heated to 245° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.

The yield of the polyphenylene sulfide recovered was 68.0%, and the viscosity was 6.1 Pa·S.

Comparative Example 7

A dehydration reaction (first step) and a polymerization reaction (second step) were performed according to the method as shown in the FIGURE to prepare a PPS polymer.

(1) The Dehydration Reaction

Sodium sulfide ($Na_2S$) was prepared by mixing 1.00 equivalent of sodium hydrosulfide (NaSH) and 1.05 equivalents of sodium hydroxide (NaOH) in a reactor. At this time, 0.20 equivalent of sodium acetate ($CH_3COONa$) powder, 1.65 equivalents of N-methyl-2-pyrrolidone (NMP) and 4.72 equivalents of distilled water were added to the reactor. The reactor was heated to 205° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 28.9% as measured by gas chromatography. In addition, a molar ratio of $H_2O/S$ in the remaining mixture obtained as the sulfur source was calculated to be 1.72.

(2) The Polymerization Reaction

After a temperature of the reactor including the sulfur source obtained by the dehydration reaction was lowered below 170° C., 1.04 equivalents of para-dichlorobenzene (p-DCB) and 1.65 equivalents of NMP were added to the reactor. Herein, a molar ratio of NMP/S was calculated to be 2.95. Then, the obtained mixed solution was heated to 230° C. to react for 2 hours, and further heated to 270° C. to react for another 2 hours. After the reaction was completed, 3 equivalents of distilled water was added into the reactor based on 1 equivalent of sulfur present in the reactor, and the temperature was sufficiently lowered to recover the resultant. The resultant was filtered with a mixed solution of distilled water and NMP (mixed volume ratio=1:1), but polyphenylene sulfide particles could not be obtained.

Comparative Example 8

A dehydration reaction (first step) and a polymerization reaction (second step) were performed according to the method as shown in the FIGURE to prepare a PPS polymer.
(1) The Dehydration Reaction
Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 1.65 equivalents of N-methyl-2-pyrrolidone (NMP) and 4.72 equivalents of distilled water were added to the reactor. The reactor was heated to 185° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 30.2% as measured by gas chromatography. In addition, a molar ratio of $H_2O/S$ in the remaining mixture obtained as the sulfur source was calculated to be 2.26.
(2) The Polymerization Reaction
After a temperature of the reactor including the sulfur source obtained by the dehydration reaction was lowered below 170° C., 1.04 equivalents of para-dichlorobenzene (p-DCB) and 1.35 equivalents of NMP were added to the reactor. Herein, a molar ratio of NMP/S was calculated to be 2.63. Then, the obtained mixed solution was heated to 220° C. to react for 2 hours, and further heated to 250° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.
The yield of the polyphenylene sulfide recovered was 74.6%, and the viscosity was 38.3 Pa·S.

Comparative Example 9

A dehydration reaction (first step) and a polymerization reaction (second step) were performed according to the method as shown in the FIGURE to prepare a PPS polymer.
(1) The Dehydration Reaction
Sodium sulfide ($Na_2S$) was prepared by mixing 1.00 equivalent of sodium hydrosulfide (NaSH) and 1.05 equivalents of sodium hydroxide (NaOH) in a reactor. At this time, 1.65 equivalents of N-methyl-2-pyrrolidone (NMP) and 4.72 equivalents of distilled water were added to the reactor. The reactor was heated to 185° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 30.0% as measured by gas chromatography. In addition, a molar ratio of $H_2O/S$ in the remaining mixture obtained as the sulfur source was calculated to be 1.50.
(2) The Polymerization Reaction
After a temperature of the reactor including the sulfur source obtained by the dehydration reaction was lowered below 170° C., 1.04 equivalents of para-dichlorobenzene (p-DCB) and 1.35 equivalents of NMP were added to the reactor. Herein, a molar ratio of NMP/S was calculated to be 2.60. Then, the obtained mixed solution was heated to 230° C. to react for 2 hours, and further heated to 250° C. to react for another 2 hours. After the reaction was completed, 3 equivalents of distilled water was added into the reactor based on 1 equivalent of sulfur present in the reactor, and the temperature was sufficiently lowered to recover the resultant. The resultant was washed sequentially with a mixed solution of distilled water and NMP (mixed volume ratio=1:1), and distilled water, followed by filtration. Subsequently, the resultant was washed with NMP for 10 minutes at 90° C., followed by filtration, and further washed with 0.4% acetic acid aqueous solution at 90° C., followed by filtration. Thereafter, it was filtered again with distilled water for 10 minutes at 90° C. The washed polyphenylene sulfide was recovered by drying in a vacuum oven at 150° C. for 8 hours.
The yield of the polyphenylene sulfide recovered was 64.8%, and the viscosity was 5.4 Pa·S.

Comparative Example 10

A dehydration reaction (first step) and a polymerization reaction (second step) were performed according to the method as shown in the FIGURE to prepare a PPS polymer.
(1) The Dehydration Reaction
Sodium sulfide ($Na_2S$) was prepared by mixing 1.00 equivalent of sodium hydrosulfide (NaSH) and 1.05 equivalents of sodium hydroxide (NaOH) in a reactor. At this time, 0.44 equivalent of sodium acetate ($CH_3COONa$) powder, 4.00 equivalents of N-methyl-2-pyrrolidone (NMP) and 4.72 equivalents of distilled water were added to the reactor. The reactor was heated to 185° C. for 1 hour while stirring at 150 rpm to perform a dehydration reaction, and a remaining mixture obtained after the dehydration reaction was obtained as a sulfur source. Herein, the NMP concentration (v/v %) in the dehydration liquid removed to the outside during the dehydration reaction was 53.0% as measured by gas chromatography. In addition, a molar ratio of $H_2O/S$ in the remaining mixture obtained as the sulfur source was calculated to be 1.64.
(2) The Polymerization Reaction
After a temperature of the reactor including the sulfur source obtained by the dehydration reaction was lowered below 170° C., 1.04 equivalents of para-dichlorobenzene (p-DCB) and 1.35 equivalents of NMP were added to the reactor. Herein, a molar ratio of NMP/S was calculated to be 4.05. Then, the obtained mixed solution was heated to 230° C. to react for 2 hours, and further heated to 260° C. to react for another 2 hours. After the reaction was completed, 3 equivalents of distilled water was added into the reactor based on 1 equivalent of sulfur present in the reactor, and the temperature was sufficiently lowered to recover the resultant. The resultant was filtered with a mixed solution of distilled water and NMP (mixed volume ratio=1:1), but polyphenylene sulfide particles could not be obtained.

Experimental Example 1

Physical properties of the polyphenylene sulfide (PPS) prepared in Examples and Comparative Examples were measured by the following method, and the results are shown in Table 1 below.

1) Melt Viscosity (Pa·S): Each polyphenylene sulfide resin (approximately 5-10 g of dry sample) was placed on an equilibrium plate using ARES-G2 (Advanced Rheometric Expansion System), and the melt viscosity was measured at 300° C. by changing an angular frequency from 0.1 to 100 rad/s using a frequency sweeping method.

2) Yield: After weighing the dried polyphenylene sulfide (PPS) with an electronic balance, the number of moles was calculated based on a repeating unit value (108.16 g/mol). That is, the yield of the polymer actually recovered (mol/mol %) was calculated based on the number of moles of sodium sulfide added less or the number of moles of para-dichlorobenzene.

TABLE 1

| | Dehydration | | | Polymerization | | | Properties of PPS | |
|---|---|---|---|---|---|---|---|---|
| | Temp. of dehyd. (° C.) | Eq. ratio of NaOAC input/sulfur source | NMP conc. in dehyd. liquid (v/v %) | Eq. ratio of p-DCB/sulfur source | Temp. of pre-polym. (° C.) | Temp. of post-polym. (° C.) | Melt visc. (Pa·S) | Yield (%) |
| Ex. 1 | 195 | 0.44 | 30.2 | 1.04 | 230 | 260 | 73.8 | 85.8 |
| Ex. 2 | 205 | 0.44 | 30.6 | 1.06 | 230 | 250 | 58.0 | 86.4 |
| Ex. 3 | 205 | 0.44 | 30.9 | 1.04 | 230 | 255 | 65.1 | 85.0 |
| Ex. 4 | 185 | 0.44 | 31.0 | 1.06 | 230 | 260 | 46.4 | 91.6 |
| Ex. 5 | 195 | 0.44 | 29.9 | 1.08 | 230 | 260 | 27.3 | 87.8 |
| Comp. Ex. 1 | 185 | 0.44 | 29.7 | 1.015 | 230 | 250 | 56.4 | 79.6 |
| Comp. Ex. 2 | 180 | 0.44 | 30.2 | 0.99 | 230 | 250 | 61.1 | 77.7 |
| Comp. Ex. 3 | 180 | 0.44 | 30.4 | 0.99 | 230 | 260 | 220.3 | 69.4 |
| Comp. Ex. 4 | 215 | 0.44 | 35.0 | 1.025 | 230 | 250 | 62.3 | 74.8 |
| Comp. Ex. 5 | 185 | 0.44 | 28.9 | 1.10 | 230 | 250 | 9.8 | 83.2 |
| Comp. Ex. 6 | 210 | 0.2 | 28.6 | 1.04 | 230 | 245 | 6.1 | 68.0 |
| Comp. Ex. 7 | 205 | 0.2 | 28.9 | 1.04 | 230 | 270 | — | — |
| Comp. Ex. 8 | 185 | 0.44 | 30.2 | 1.04 | 220 | 250 | 38.3 | 74.6 |
| Comp. Ex. 9 | 185 | 0 | 30 | 1.04 | 230 | 250 | 5.4 | 64.8 |
| Comp. Ex. 10 | 185 | 0.44 | 53 | 1.04 | 230 | 260 | — | — |

In the Table 1, Comparative Example 7 and Comparative Example 10 could not produce polyphenylene sulfide (PPS) particles, so the physical properties could not be evaluated.

As shown in Table 1, a polyarylene sulfide having a melt viscosity of 27.3 Pa·S to 73.8 Pa·S could be effectively prepared at a high yield of 85% or more by using a dihalogenated aromatic compound in an optimum equivalent ratio of 1.04 to 1.08 with respect to a hydrosulfide of an alkali metal in the polymerization process of a polyarylene sulfide and performing both dehydration of the first step and polymerization of the second step under optimum conditions.

The invention claimed is:

1. A preparation method of a polyarylene sulfide, comprising:
    preparing a sulfur source comprising a sulfide of an alkali metal and a mixed solvent of water and an amide-based compound by dehydrating a hydrosulfide of an alkali metal and a hydroxide of an alkali metal in the presence of an organic acid salt of an alkali metal at a temperature of 185° C. to 205° C. in a mixed solvent of water and an amide-based compound; and
    preparing a polyarylene sulfide by adding a dihalogenated aromatic compound and an amide-based compound to a reactor containing the sulfur source, and performing a polymerization reaction at a temperature of 225° C. to 245° C., followed by a polymerization reaction at a temperature of 250° C. to 260° C.;
    wherein a dehydration liquid removed during the dehydration reaction contains 15% (v/v) to 35% (v/v) of the amide-based compound based on a total volume of the mixed solvent of water and amide-based compound, and
    the dihalogenated aromatic compound is used in an amount of 1.04 to 1.08 equivalents based on 1 equivalent of the hydrosulfide of an alkali metal in the polymerization reaction.

2. The preparation method of a polyarylene sulfide according to claim 1, wherein the organic acid salt of an alkali metal is used in an amount of 0.01 to 1.0 equivalent based on 1 equivalent of the hydrosulfide of an alkali metal.

3. The preparation method of a polyarylene sulfide according to claim 1, wherein the organic acid salt of an alkali metal comprises lithium acetate, sodium acetate, or a mixture thereof.

4. The preparation method of a polyarylene sulfide according to claim 1, wherein the water is used in an amount of 1 to 8 equivalents based on 1 equivalent of the amide-based compound in the preparation of the sulfur source.

5. The preparation method of a polyarylene sulfide according to claim 1, wherein the sulfur source comprises water in a molar ratio of 1.5 to 3.5 based on 1 mol of sulfur.

6. The preparation method of a polyarylene sulfide according to claim 1, further comprising a step of lowering the temperature of the reactor containing the sulfur source to a temperature of 150° C. or more and less than 200° C. before the second step.

7. The preparation method of a polyarylene sulfide according to claim 1, wherein the amide-based compound is added so as to have a molar ratio of 2.5 to 4.0 based on 1 mol of sulfur in preparing the polyarylene sulfide.

8. The preparation method of a polyarylene sulfide according to claim 1, wherein the dihalogenated aromatic compound comprises at least one selected from the group consisting of o-dihalobenzene, m-dihalobenzene, p-dihalobenzene, dihalotoluene, dihalonaphthalene, dihalobiphenyl, dihalobenzoic acid, dihalodiphenyl ether, dihalodiphenylsulfone, dihalodiphenylsulfoxide, and dihalodiphenylketone.

9. The preparation method of a polyarylene sulfide according to claim 1, wherein the polyarylene sulfide is produced at a yield of 85% or more, and has a melt viscosity of 20 Pa·S to 150 Pa·S.

10. The preparation method of a polyarylene sulfide according to claim 1, further comprising cooling by adding water to the reaction mixture in an amount of 3 to 5 equivalents based on 1 equivalent of sulfur after preparing the polyarylene sulfide.

11. The preparation method of a polyarylene sulfide according to claim 10, further comprising washing and drying the reaction mixture using water and an amide-based compound after the cooling.

* * * * *